United States Patent [19]

Terbrack

[11] Patent Number: 5,161,760
[45] Date of Patent: Nov. 10, 1992

[54] MOVABLE KEYBOARD FOREARM, WRIST AND HAND SUPPORT DEVICE

[76] Inventor: William H. Terbrack, 32121 Fall River Rd., Trabuco Canyon, Calif. 92679

[21] Appl. No.: 690,727

[22] Filed: Apr. 24, 1991

[51] Int. Cl.⁵ .............................................. B68G 5/00
[52] U.S. Cl. .................................. 248/118; 400/715; 340/711
[58] Field of Search .................. 400/715; 297/411; 248/118.1, 118, 279, 285; 340/711, 709

[56] References Cited

U.S. PATENT DOCUMENTS

| | | | |
|---|---|---|---|
| 3,191,994 | 6/1965 | Boyce | 297/411 |
| 4,378,553 | 3/1983 | McCall | 341/21 |
| 4,670,743 | 6/1987 | Zemke | 340/706 |
| 4,688,862 | 8/1987 | Fowler et al. | 248/118.3 |
| 4,709,972 | 12/1987 | LaBudde et al. | 400/715 |
| 4,769,517 | 9/1988 | Swinney | 340/709 |
| 5,050,826 | 9/1991 | Johnston | 400/715 |
| 5,058,840 | 10/1991 | Moss et al. | 400/715 |

OTHER PUBLICATIONS

Advertisement for Under Desk and Desk Top Keyboard Drawers from MISCO, Prior Mar., 1991.

*Primary Examiner*—Jeffery A. Brier
*Assistant Examiner*—A. Au
*Attorney, Agent, or Firm*—Stetina and Brunda

[57] ABSTRACT

This invention relates to a keyboard forearm, wrist and hand support device for use in conjunction with the keyboard of a video display terminal work station. The support device of the present invention is adapted to reduce occurrence of repetitive strain injury by reducing stress on the user's shoulders, arms, wrists and hands. The support device comprises a pair of support members which are interfaced to a frame member via a pair of carriage members. The carriage members are adapted to permit the support members to be movable laterally and longitudinally relative the frame so as to provide complete access to the work surface of a keyboard positioned upon the frame. The support device may further include a finger-activated cursor control interfaced directly to the frame or to a keyboard positioned thereon for selectively positioning a cursor upon a display screen comprising a video display terminal workstation.

4 Claims, 3 Drawing Sheets

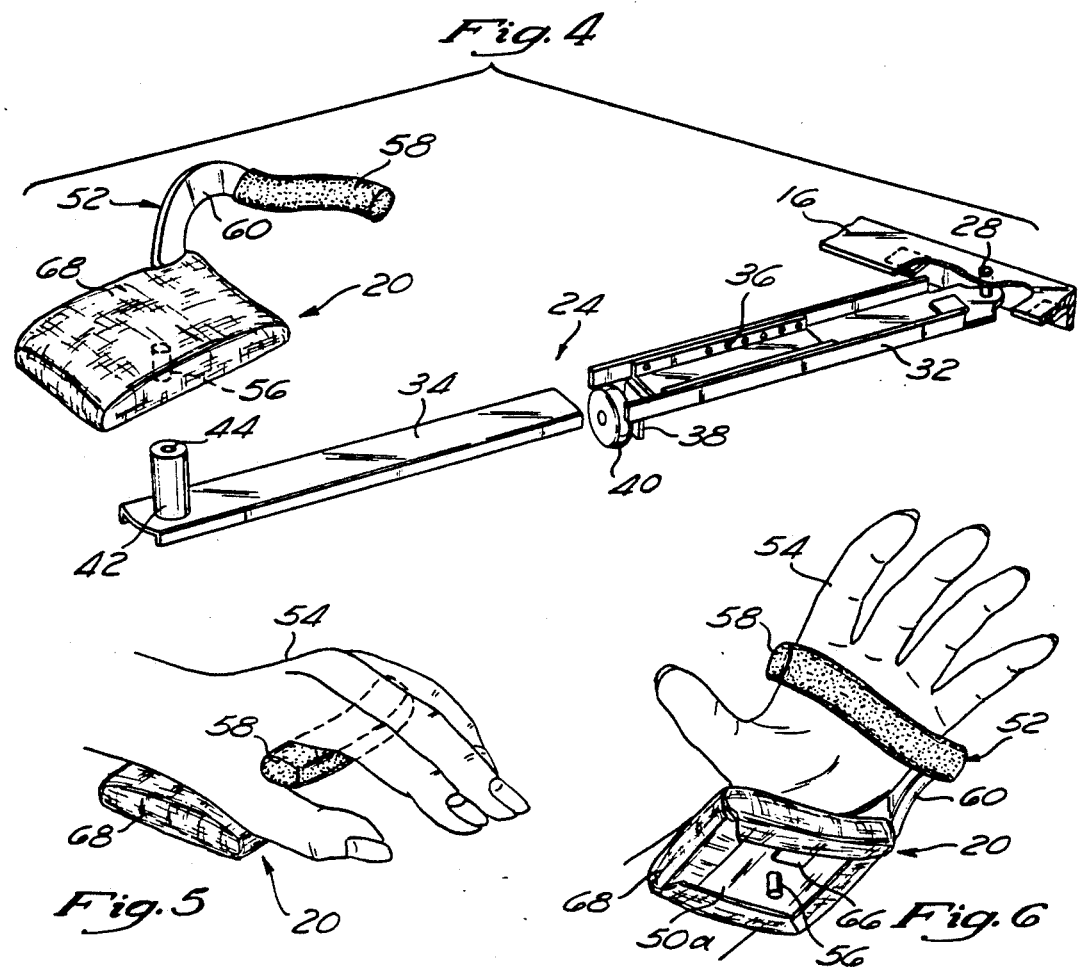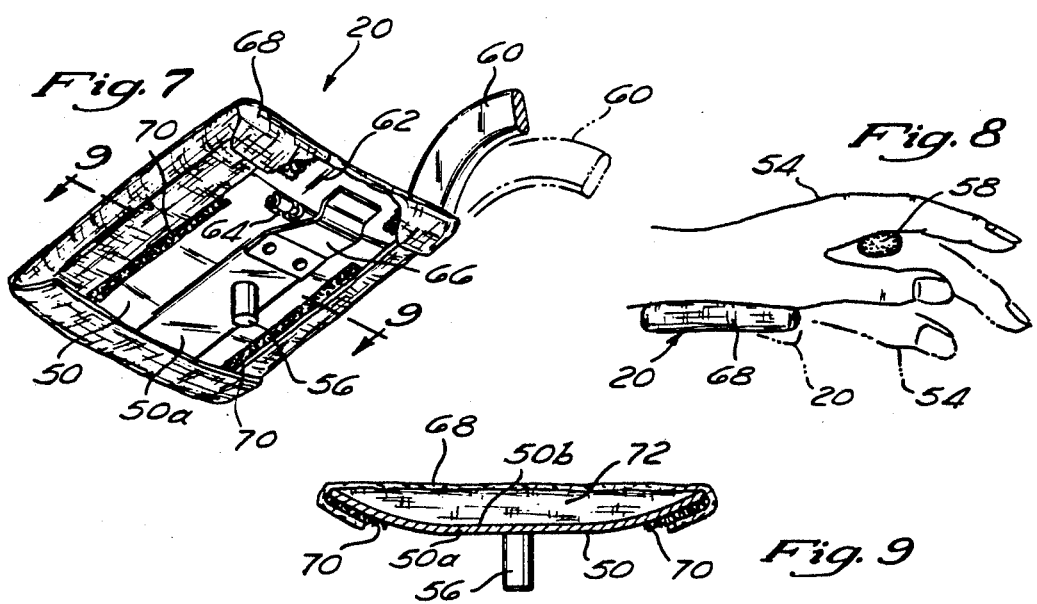

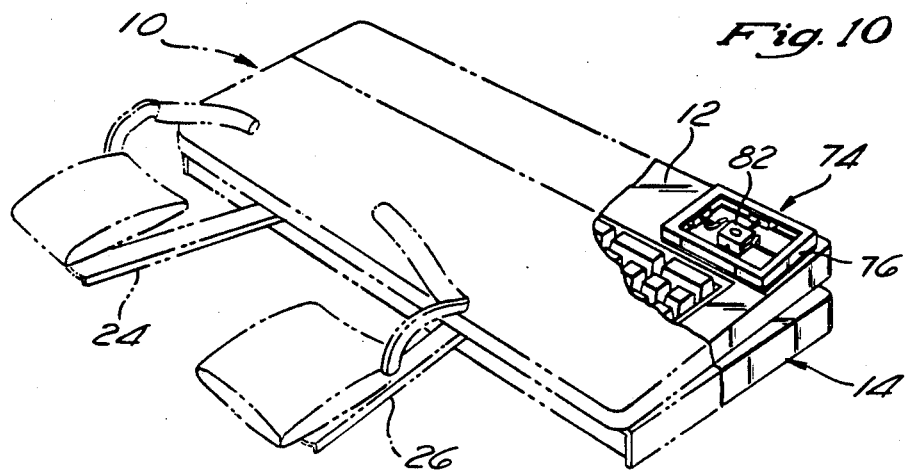
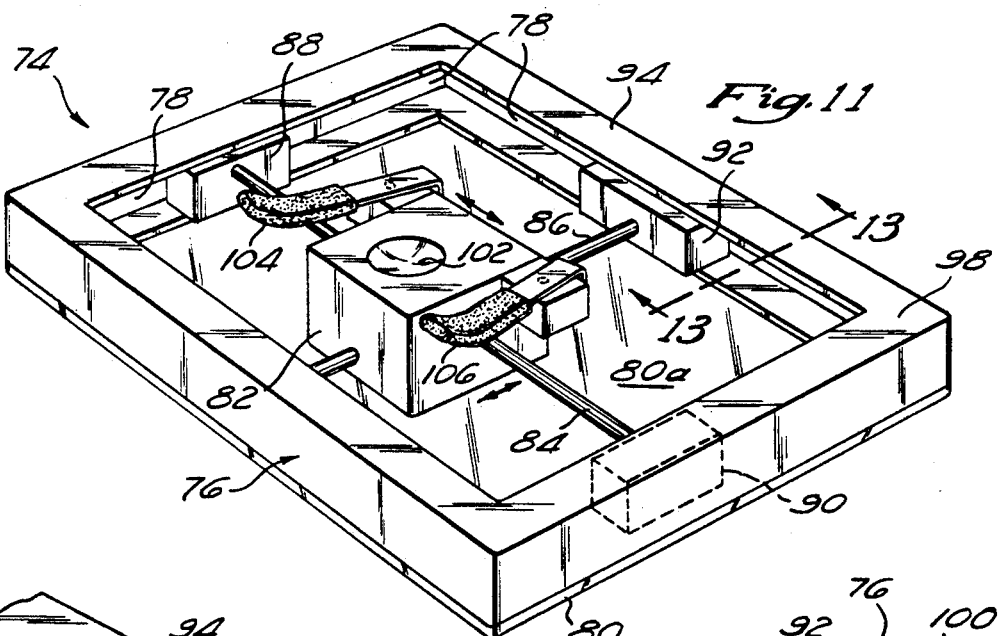
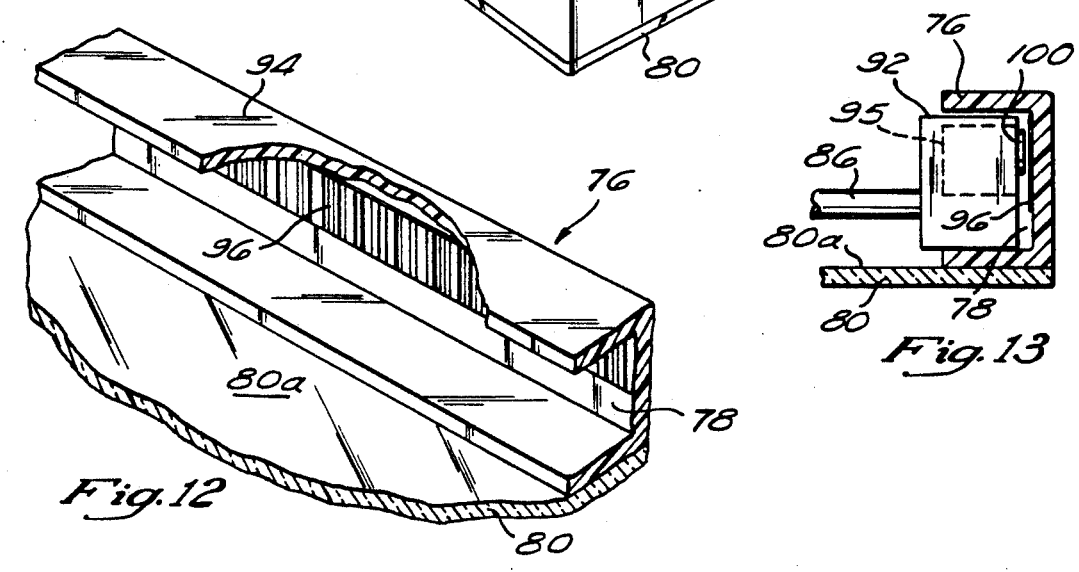

MOVABLE KEYBOARD FOREARM, WRIST AND HAND SUPPORT DEVICE

FIELD OF THE INVENTION

The present invention relates generally to office equipment, and more particularly to a device for supporting portions of the forearms, wrists and hands of an individual during the use of a keyboard associated with a conventional video display terminal.

BACKGROUND OF THE INVENTION

Recently, investigations conducted by the National Institute for Occupational Safety and Health and various world-wide studies have demonstrated elevated occurrences of musculoskeletal discomforts and disorders in video display terminal (VDT) operators as compared with non-VDT workers. Statistics from these investigations and studies have shown a correlation between VDT use and shoulder, neck discomfort/pain and wrist tendinitis. However, one of the most serious of the newly emerging disorders revealed from the studies is referred to as repetitive strain injury (RSI) or cumulative trauma disorder. A form of RSI is commonly known as carpel tunnel syndrome.

RSI is believed to typically occur when a person repeats the same motion thousands of times a day. Such repeated motion typically occurs in conjunction with those professions associated with prolonged or continuous use of video display terminal keyboards, i.e. where the individual is required to type much of the day. Examples of such professions include secretaries and data processing personnel. The studies have concluded that when working on a video display terminal keyboard for prolonged periods of time, the tendons of in the user's wrists will oftentimes become inflamed and put pressure on the median nerve which resides in the area of the wrist known as the carpel tunnel. Because the VDT operator is conducting the same motions thousands of times a day when continuously typing, the injury process to which the tendons are subjected from such repeated movements constantly progresses since no opportunity is given for a natural healing process to occur. The pressure caused to the median nerve by the inflamed tendons typically causes symptoms of numbness in the fingers or severe burning sensations in the wrists, oftentimes necessitating corrective surgery to eliminate the discomfort to the individual.

In recent years, researchers have been conducting studies to determine various methods of preventing occurrences of RSI in VDT operators. In this respect, various computer manufacturers have begun to design equipment which is adapted to lower the probability of an operator developing RSI by improving the operator's position relative the VDT workstation so as to minimize stress on the wrists, forearms and shoulders. Such enhancements include the use of arm rests, wrist rests and foot rests in conjunction with the VDT workstation. Additionally, the computer screens and keyboards of the workstation are adapted to be raised or lowered by the VDT operator. In addition to the aforementioned equipment modifications, VDT operators are also trained to use easier and lighter key strokes and to take more frequent rests. Indeed, the consensus of the National Institute for Occupational Safety and Health, the World Health Organization, and the American National Standards Institute is that the use of adjustable VDT workstations in combination with training on proper adjustment of the work station and periodic VDT use during the work day substantially contributes to suitable working postures which in turn provides a safer working environment for the VDT operator.

In December of 1990, the City of San Francisco enacted a VIDEO DISPLAY TERMINAL WORKERS SAFETY ORDINANCE to benefit employees whose duties include routinely performing repetitive keyboard motions four hours or more, inclusive of breaks, per shift. The ordinance makes it mandatory for employers to provide such operators with user-adjustable workstations and chairs that meet various minimum standards. Such standards include the provision of arm rests, wrist rests, and foot rests upon operator request which will enable the operator to maintain a neutral position of the wrist while at the VDT workstation keyboard.

Since estimates place the number of Americans who work on computers, i.e. VDT's, to be approximately twenty-five million, the need for providing various equipment enhancements to the VDT workstation to eliminate occurrences of RSI is of increasing importance. The present invention addresses the aforementioned concerns by providing a movable keyboard forearm, wrist and hand support device for use in conjunction with a keyboard of a VDT workstation which is adapted to decrease occurrences of RSI in VDT operators.

SUMMARY OF THE INVENTION

In accordance with the preferred embodiment of the present invention, there is provided a movable keyboard forearm, wrist and hand support device for use in conjunction with the keyboard of a video display terminal workstation. The device generally comprises a frame which is formed to support a keyboard thereon. The device further comprises a pair of support members which are connected to the frame and which are adapted to support portions of the user's forearms, wrists, and hands thereon. The support members are connected to the frame in a manner allowing relative movement of each of the support members relative the frame in both longitudinal and lateral directions.

In the preferred embodiment, the support members are connected to the frame by a pair of elongate carriage members. The carriage members include distal ends which are pivotally connected to the frame and proximal ends which are rotatably connected to a respective one of the support members. Each of the carriage members comprises a guide member and an insert member which is slidably connected to the guide member. Importantly, the slidable connection of the insert member to the guide member allows the insert member to be extendable or retractable relative the guide member. The slidable connection between the guide member and insert member is preferably facilitated by a linear bearing. Each guide member comprising each carriage member also includes a support wheel attached thereto for providing a rolling engagement between a respective one of the carriage members and a planar portion of the frame.

In the preferred embodiment, each of the support members comprise a base member and a handle member pivotally connected to the base member. Each of the base members is sized and configured to support portions of a user's forearm and wrist while each of the handle members is adapted to provide support to the palmar surface of the user's hand. The support members further include biasing means to maintain the handle members against the palmar surfaces of the user's hands. The biasing means preferably comprises a leaf spring which is attached to the lower surface of the base member. As will be recognized, the pivotal connection of the handle member to the base member allows limited extension and flexion of the user's wrist relative the base member. Each base member also includes a layer of cushioning material thereon which is attached to the base member. Additionally, a handle member of one of the support members may include one or more switches for selectively activating or deactivating peripheral equipment related to the video display workstation.

In accordance with another aspect of the present invention, the support device may also be used in conjunction with a finger-activated cursor control which mimics the functions of a conventionally known "mouse" and is attachable to either the frame or the keyboard disposed upon the frame as well as may be formed as an integral portion of a keyboard at the time of manufacture. In this respect, the only requirement is that the cursor control be accessible by one of the supported hands of the user via movement of one of the carriage members. Particularly, the cursor control comprises a finger-operated slider member which is movable longitudinally and laterally relative a control frame by a single finger of the supported hand of the user and adapted to provide controlled movement of a cursor upon a video display terminal screen. The slider member further includes switches associated therewith which facilitate the control switch functions associated with most conventional mouse systems.

It is an object of the present invention to provide a support device for use in conjunction with the keyboard of a video display workstation for reducing the stress on the shoulders, arms, wrists and hands of a VDT user.

Another object of the present invention is to provide a support device for use in conjunction with the keyboard of a video display workstation which is adapted to selectively display and move a cursor about a VDT screen.

Another object of the present invention is to provide a support device for use in conjunction with the keyboard of a video display workstation which is adapted to selectively operate peripheral equipment related to the VDT workstation.

BRIEF DESCRIPTION OF THE DRAWINGS

These as well as other features of the present invention will become more apparent upon reference to the drawings wherein:

FIG. 4 is an exploded view illustrating the components comprising a carriage member and the manner in which the carriage member is interfaced to the frame and a support member;

FIG. 5 is a top perspective view illustrating the interface of a user's hand to a support member;

FIG. 6 is a bottom perspective view illustrating the interface of a user's hand to a support member;

FIG. 7 is a bottom perspective view illustrating the manner in which the handle member and the base member comprising each support member are connected;

FIG. 8 is a perspective view illustrating the range of motion of a user's hand facilitated by the pivotal connection of the handle member to the base member;

FIG. 9 is a cross-sectional view taken along line 9—9 of FIG. 7;

FIG. 10 a perspective view of the support device of the present invention, illustrating a finger-activated cursor control positioned on the keyboard;

FIG. 11 is a perspective view of the cursor control shown in FIG. 10;

FIG 12 is a partial perspective view illustrating a linear optical incremental encoder interfaced to the frame of the cursor control; and FIG. 13 is a cross-sectional view taken along line 13—13 of FIG. 11.

DETAILED DESCRIPTION OF THE PREFERRED EMBODIMENT

Figure 1:
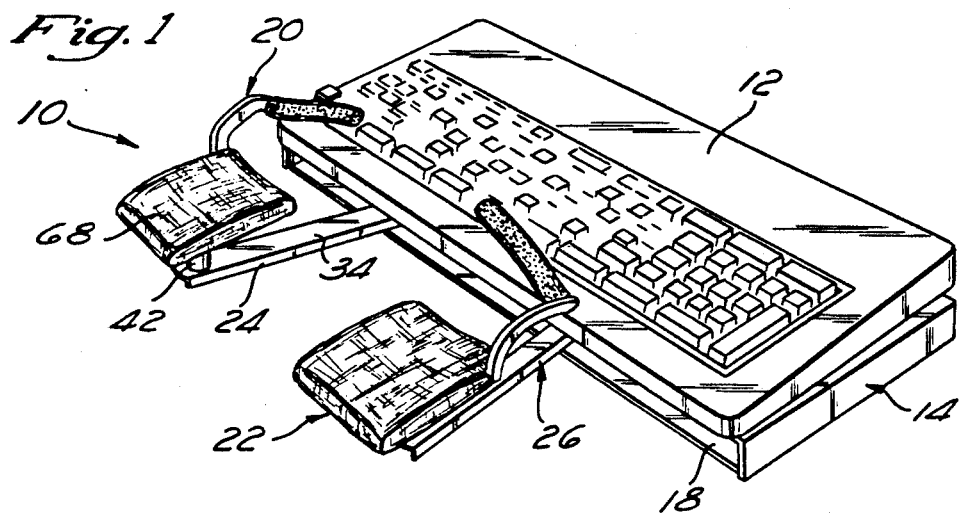
FIG. 1 is a perspective view of the support device of the present invention, illustrating a keyboard positioned thereon.

Referring now to the drawings wherein the showings are for purposes of illustrating a preferred embodiment of the present invention only and not for purposes of limiting the same, FIG. 1 perspectively illustrates the keyboard forearm, wrist and hand support device 10 of the present invention having a keyboard 12 associated with a conventional video display terminal workstation positioned thereon.

Figure 2:
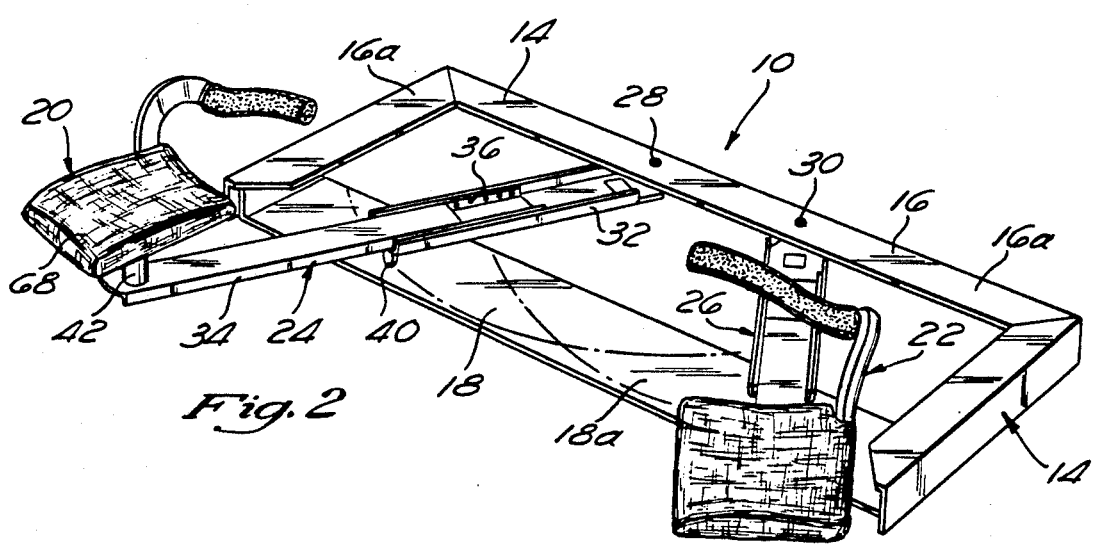
FIG. 2 is a perspective view of the present invention.
Figure 3:
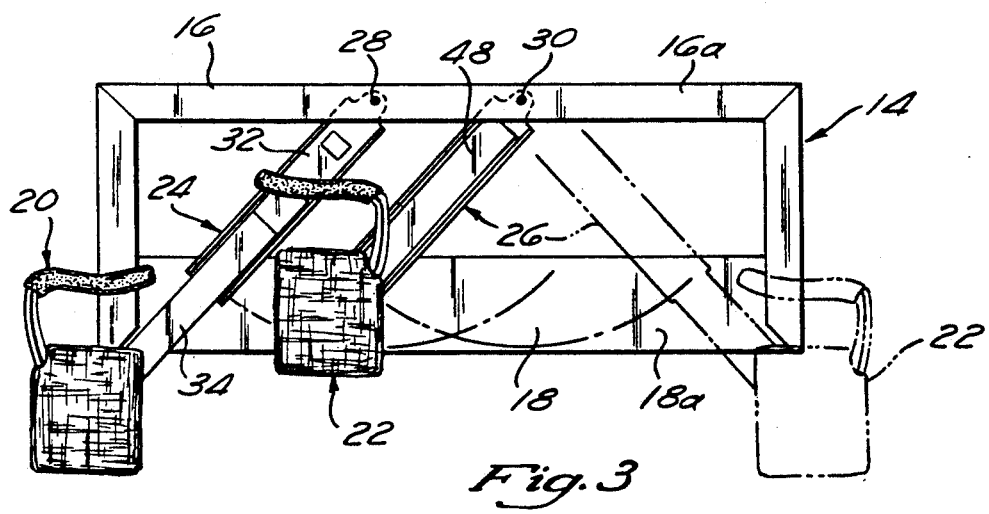
FIG. 3 is a top view of the present invention illustrating the range of motion of the support members.

As seen in FIGS. 2 and 3, support device 10 generally comprises a frame 14 having a generally rectangular configuration. Particularly, frame 14 is formed from an elongate member 16 which is cut and bent in a manner so as to form a longitudinal side and two lateral sides. Extending between and interconnecting the proximal ends of the lateral sides of elongate member 16 is a planar member 18. As seen in FIG. 1, when keyboard 12 is interfaced to frame 14, the keyboard 12 rests against the upper surface 16a of elongate member 16 but does not come in contact with the upper surface 18a of planar member 18.

Interfaced to frame 14 is a first support member 20 and a second support member 22. In the preferred embodiment, support members 20 and 22 are each adapted to support portions of a user's forearm, wrist and hand thereon. First support member 20 is connected to frame 14, and more particularly elongate member 16, via a first carriage member 24 while second support member 22 is connected to elongate member 16 via a second carriage member 26. In the preferred embodiment, first carriage member 24 and second carriage member 26 are adapted to allow relative movement of support members 20 and 22 relative the frame 14 in both longitudinal and lateral directions, as seen in FIG. 3. As will be recognized, such longitudinal and lateral movement capability allows the hands of the user to be selectively positioned over all areas of the keyboard 12. To facilitate such movement of the support members 20 and 22, the distal ends of carriage members 24 and 26 are pivotally connected to elongate member 16 via a first pivot pin 28 and a second pivot pin 30, respectively. Additionally, first support member 20 and second support member 22 are rotatably connected to the proximal ends of first carriage member 24 and second carriage member 26, respectively, in a manner which will be discussed in greater detail below.

Referring now to FIG. 4, first carriage member 24 generally comprises a guide member 32 and an insert member 34 which is slidably connected thereto. In the preferred embodiment, the slidable connection between guide member 32 and insert member 34 is facilitated by a linear bearing 36 disposed within guide member 32. As will be recognized, the slidable connection of insert member 34 to guide member 32 via linear bearing 36 allows insert member 34 to be extendable and retractable relative guide member 32 in the manner shown in FIG. 3. As seen in FIG. 4, the end of guide member 32 opposite that pivotally connected to elongate member 16 includes a flange 38 extending downwardly therefrom. Attached to flange 38 is a support wheel 40 which is used to provide a rolling engagement between first carriage member 24 and upper surface 18a of planar member 18 when first carriage member 24 is connected to frame 14. In this respect, support wheel 40 is moved about an arcuate path upon upper surface 18a of planar member 18 due to the pivotal connection of first carriage member 24 to elongate member 16. Extending upwardly from the end of insert member 34 opposite that which is inserted into guide member 32 is a mandrel 42 having a generally cylindrical configuration and including an aperture 44 disposed axially therein. Mandrel 42 is used to facilitate the rotatable attachment of first support member 20 to first carriage member 24. Though not fully shown, second carriage member 26 has a configuration identical to first carriage member 24 and comprises a second guide member 46 having a second insert member 48 slidably connected thereto.

Referring now to FIGS. 4-9, first support member 20 generally comprises a base member 50 having a handle member pivotally connected thereto. As will be recognized, first support member 20 is adapted to be used in conjunction with the left hand 54 of the user. As seen in FIGS. 5 and 6, base member 50 is sized and configured to support portions of the left forearm and wrist of the user. Additionally, handle member 52 is connected to base member in a manner so as to extend laterally across and provide support to the palmar surface of the user's hand 54. Extending downwardly from the lower surface 50a of base member 50 is a projection 56 having a generally cylindrical configuration. In the preferred embodiment, projection 56 is slidably received into the aperture 44 of mandrel 42 thereby facilitating the rotatable engagement of first support member 20 to first carriage member 24.

As previously specified, handle member 52 is pivotally connected to base member 50. Particularly, handle member comprises a handle portion 58 and an arcuate portion 60. When the user's hand 54 is interfaced to first support member 20, the palmar surface of the user's hand 54 rests against the handle portion 58 of the handle member 52. As best seen in FIG. 7, attached to the end of arcuate portion opposite that interfaced to handle portion 58 is an extension 62 which is connected to lower surface 50a of base member 50 via a hinge 64. In the preferred embodiment, handle member 52 is biased so as to maintain the handle portion 58 against the palmar surface of the user's hand 54. The biasing means preferably comprises a leaf spring 66 which is attached to the lower surface 50a of base member 50. Importantly, leaf spring 66 is attached to base member 50 in a manner wherein a portion of leaf spring 66 is in abutting contact with the extension 62 of handle member 52. As can be appreciated, such abutting contact is operable to bias the handle portion 58 in the manner previously described. As seen in FIG. 8, the pivotal connection of handle member 52 to base member 50 facilitated by hinge 64 and the biasing action provided by leaf spring 66 allows limited extension and flexion of the user's wrist relative base member 50 in the manner shown. Such movement of the wrist aids the user in gaining complete accessibility to the work surface of keyboard 12.

Referring now to FIG. 9, base member 50 has a generally concave configuration and includes a sheet of cushioning material 68 attached thereto. It will be recognized that the handle portion 58 of handle member 52 is likewise covered with a layer of cushioning material. Cushioning material 68 is attached to lower surface 50a of base member 50 which may be facilitated utilizing various means such as the use of velcro fasteners 70. Importantly, due to the concave configuration of base member 50 and the manner in which cushioning material 68 is interfaced thereto, a gap 72 is formed between cushioning material 68 and the upper surface 50b of base member 50. Gap 72 is used to provide an air-cushion thereby providing greater comfort to the user during the use of support device 10. Though the previous discussion has focused on the structure of first support member 20, it will be recognized that the structure of second support member 22 is identical to first support member 20 but reversed in orientation so as to be usable with the right hand of the user.

Referring now to FIGS. 10-13, the support device 10 of the present invention may further be used in conjunction with a finger-activated cursor control 74. As seen in FIG. 10, cursor control 74 is shown as being attached to the top surface of the keyboard 12. It will be appreciated however that cursor control 74 may be directly interfaced to the frame 14 of support device 10, the only requirement being that the control 74 be accessible to one of the supported hands of the user via the movement of the first carriage member 24 or second carriage member 26.

As seen in FIG. 11, cursor control 74 generally comprises a control frame 76 having a generally rectangular configuration including two longitudinal sides and two lateral sides. In the preferred embodiment, control frame 76 is constructed from channeled stock so as to define a generally U-shaped recess 78 about the inner periphery thereof. Attached to the lower surface of frame 76 is a generally planar plate member 80.

Disposed upon upper surface 80a of plate member 80 is a slider member 82 having a generally cubic configuration. Slidably extending through slider 82 are a first longitudinally extending rod 84 and a second laterally extending rod 86. Attached to the opposed ends of first rod 84 are a left longitudinal support 88 and a right longitudinal support 90. Similarly, attached to opposed ends of second rod 86 are a top lateral support 92 and a bottom lateral support (not shown). Importantly, longitudinal supports 88 and 90 are sized and configured to be slidably retained within the U-shaped recess 78 defined within the lateral sides of frame 76 so as to permit slider 82 to be movable laterally relative frame 76. Additionally, the top lateral support 92 and the bottom lateral support of the second rod 86 are sized and configured to be slidably retained within the U-shaped recess 78 defined within the longitudinal sides of frame 76 so as to permit slider 82 to be movable longitudinally relative frame 76. As will be recognized, the aforementioned manner of interfacing slider 82 to frame 76 allows slider 82 to be selectively positionable over all areas of upper surface 80a of plate member 80 through the movement of the longitudinal supports and lateral supports within the U-shaped recess 78.

To facilitate the use of cursor control 74 for purposes of controlling the movement of a cursor on a video display terminal screen, a first linear optical incremental encoder 95 (illustrated in phantom lines in FIG. 13) is carried by the top lateral support 92. Though not shown, a second linear optical incremental encoder is also carried by the longitudinal support 90. Further, a reflective optical code strip 96 is disposed within the recesses 78 of the frame 76. As best seen in FIG. 13, the encoder 95 includes a light transmission portion and dual light receiving portion 100 disposed on the side thereof directly adjacent the code strip 96. Though not shown, right longitudinal support 90 likewise includes a transmission and receiving portion disposed on the side thereof directly adjacent the code strip disposed within the right lateral side 98. In the preferred embodiment, the encoders 96 comprise encoders similar to Hewlet Packard HEDS-9200 encoders which are adapted to transmit light onto the code strip 96 and receive a reflected light therefrom to produce electrical impulses or counts to indicate the linear position of the top lateral support 92 and right longitudinal support 90, respectively relative the code strips 96. As will be recognized, by producing signals corresponding to the linear positions of the longitudinal support 90 and lateral support 92, the encoders are operable to provide an indication of the position of the slider 82 relative the frame 76. In this respect, any change in the position of the slider 82 upon upper surface 80a causes up or down counts to be produced by the encoders. These up and down counts are sent via conventional cable connections (not shown) to the computer of the video display terminal workstation to control the cursor position upon the video display terminal screen. As such, movement of the slider 82 upon upper surface 80a causes the cursor to be moved upon the screen in a direction corresponding to the direction of movement of slider 82 and in an amount proportional to the amount of movement of the slider 82 relative upper surface 80a.

As seen in FIG. 11, slider 82 includes a generally concave recess 102 disposed within the upper surface thereof. Recess 102 is sized and configured to receive the middle finger of the hand of the user to facilitate the movement of slider 82 upon upper surface 80a. Additionally, attached to the opposed lateral sides of slider 82 are a first switch 104 and a second switch 106. Assuming that slider 82 is being manipulated by the right hand of a user, first switch 104 is adapted to be selectively actuated by the index finger of the user while second switch 106 is adapted to be selectively actuated by the ring finger of the user. Though not shown, it is further contemplated that a third switch may be included within recess 102 so as to be selectively actuatable by the application of downward pressure by the middle finger of the user's hand. Switches 104 and 106 are adapted to mimic the control switch functions included with most conventional mouse systems. It will be appreciated that cursor control 74 need not be included with support device 10, but comprises an additional component which may be interfaced thereto for purposes of providing increased interaction between the VDT operator and the VDT workstation with the operator's hands remaining in supported orientations.

Through the utilization of support device 10, portions of the user's forearms, wrists and hands are supported adjacent the keyboard 12 associated with the video display terminal workstation. Due to the connection of the support members 20 and 22 to the frame 14 facilitated by the carriage members 24 and 26, the users hands are movable both longitudinally and laterally relative the frame 14. Thus, the work surface of the keyboard 12 is completely accessible to the hands of the user with the support members 20 and 22 serving to reduce the stress on the user's shoulders, arms, wrists and hands.

Additional modifications and improvements of the present invention may also be apparent to those skilled in the art. Thus, the particular combination of parts described and illustrated herein is intended to represent only one embodiment of the invention and is not intended to serve as limitations of alternative devices within the spirit and scope of the invention.

What is claimed is:

1. A keyboard, forearm, wrist and hand support device comprising:
   a frame formed to support a keyboard thereon;
   a pair of support members adapted to support portions of a user's forearms, wrists, and hands thereon, each of said support members comprising:
   a base member sized and configured to support portions of a user's forearm and wrist;
   a handle member pivotally connected to said base member for supporting the palmer surface of the user's hand; and
   biasing means to maintain said handle member against the palmar surface of the user's hand;
   wherein the pivotal connection of said handle member to said base member allows limited extension and flexion of the user's hand relative said base member; and
   means connecting said pair of support members to said frame for allowing relative movement of each of said support members relative said frame in both longitudinal and lateral directions.

2. The device of claim 1 wherein said biasing means comprises a leaf spring attached to a lower surface of said base member.

3. The device of claim 1 wherein said base member includes a layer of cushioning material thereon.

4. A keyboard forearm, wrist, and hand support device comprising:
   a frame formed to support a keyboard thereon;
   a pair of support members adapted to support portions of a user's forearms, wrist, and hands thereon, each of said support members comprising:
   a base member sized and configured to support portions of the user's forearm and wrist;
   handle means extending upwardly from said base member for supporting the palmar surface of the user's hand;
   biasing means cooperating between said base member and said handle means to maintain said handle means against the palmar surface of the user's hand;
   wherein relative movement of the handle means and the base member allows limited extension and flexion of the user's hand relative said base member; and
   means connecting said pair of support members to said frame for allowing relative movement of each of said support members relative said frame in both longitudinal and lateral directions.

* * * * *